United States Patent [19]

Carlson

[11] Patent Number: 4,971,458
[45] Date of Patent: Nov. 20, 1990

[54] FLUID DAMPER AND SPRING

[75] Inventor: Russell L. Carlson, North Palm Beach, Fla.

[73] Assignee: United Technologies Corporation, Hartford, Conn.

[21] Appl. No.: 417,108

[22] Filed: Oct. 4, 1989

[51] Int. Cl.$^5$ ............................................. F16C 27/00
[52] U.S. Cl. ...................................... 384/99; 384/581
[58] Field of Search ................. 384/99, 215, 535, 536, 384/581, 582

[56] References Cited

U.S. PATENT DOCUMENTS

| | | | |
|---|---|---|---|
| 2,614,896 | 10/1952 | Pierce, Jr. ............................... | 384/99 |
| 2,631,901 | 3/1953 | Holben et al. ........................ | 384/99 |
| 3,214,225 | 10/1965 | Warnery .......................... | 384/535 X |
| 3,219,399 | 11/1965 | Smith ................................... | 384/581 |
| 4,213,661 | 7/1980 | Marmol ................................ | 384/99 |
| 4,457,667 | 7/1984 | Seibert et al. ...................... | 384/99 X |
| 4,872,767 | 10/1989 | Knapp .................................. | 384/99 |

Primary Examiner—Thomas R. Hannon
Attorney, Agent, or Firm—Norman Friedland

[57] ABSTRACT

A fluid damper and mechanical spring for a radial bearing supporting a shaft of an aircraft gas turbine engine fabricated from a full ring having fluid cavities circumferentially space on the outer diameter of the ring operatively connected to the complementary surface of the support housing and having circumferentially spaced arcuate slots overlying the fluid cavities having a free end for providing the mechanical spring function.

4 Claims, 1 Drawing Sheet

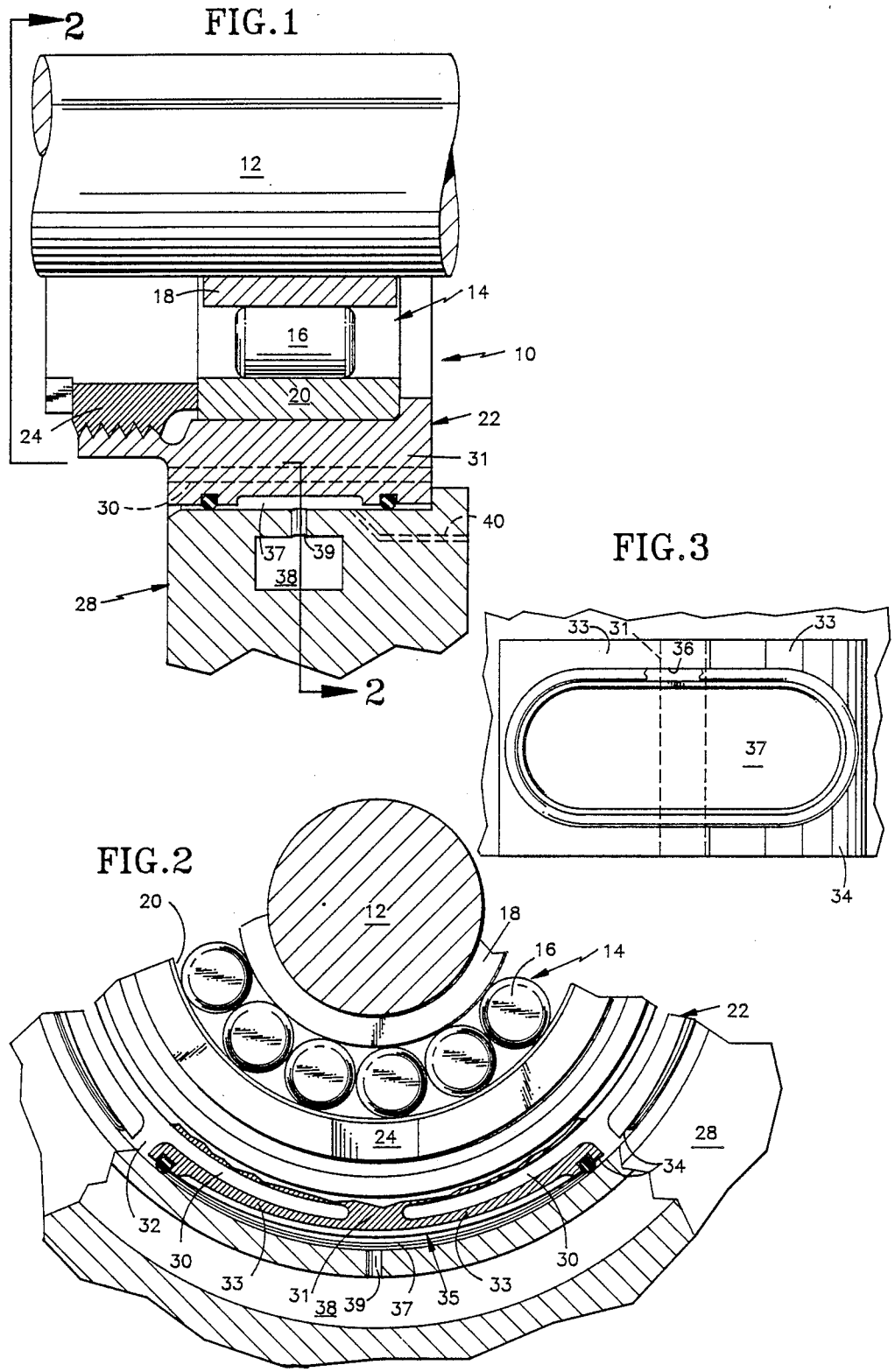

FLUID DAMPER AND SPRING

The invention was made under a U.S. Government contract and the Government has rights herein.

CROSS REFERENCE TO RELATED APPLICATION

This application relates to U.S. patent application Ser. No. 417,109 filed on even date herewith, by Russell L. Carlson entitled Fluid Damper.

TECHNICAL FIELD

This invention relates to fluid dampers for a bearing supporting a shaft for damping cyclical transverse orbital movement of a nonrotating cylindrical body occasioned by the rotating shaft which supports the compressor and turbine rotors of a gas turbine engine and particularly to the construction of the fluid damper.

BACKGROUND ART

U.S. Pat. No. 4,213,661 entitled "Bearing Support Structure Combining Fluid Damping and Spring Damping Apparatus" granted to R. A. Marmol on July 22, 1980 and assigned to the same assignee as this patent application, typifies a fluid damper that is constructed with a plurality of arcuate beams that are mounted end-to-end to surround the bearing. As disclosed in that patent, the bearing is free to move orbitally about its annular cavity. This motion is transmitted to the fluid in the damper which in turn generates a hydrodynamic pressure which resists further displacement and effectively dampens the vibratory motions. Curved beam dampers, while efficacious for damping high loads are costly to manufacture, install and maintain. Obviously, because the individual segments must be manufactured with close tolerances and care must be used in assembling the parts, they are considered complex and impose a potential wear problem on multiple parts. The curved beams which are a series of segmented parts are supported so as to also have spring-like characteristics.

Another method of obtaining the mechanical spring is to incorporate a separate mechanical spring either mounted in parallel to or in series with the fluid damper. An example of a mechanical spring and fluid damper configuration is disclosed in U.S. Pat. No. 4,457,667 granted to W. S. Seiburt and W. B. Hill on July 3, 1984 and assigned to United Technologies Corporation, the assignee of this patent application, which is incorporated herein by reference. As disclosed therein, the spring attaches to the inner support member defining the fluid damper and the bearing compartment housing and like the other mechanical spring devices serves to provide additional spring rate for a high unbalance condition as well as to center the rotor on engine shutdown. The spring consists of a plurality of rods that are circumferentially disposed around the fluid damper which, obviously, is a complex assembly. Like the heretofore known fluid damper, the springs consist of a relatively large number of parts that require close tolerances particularly to maintain the desired spring rate which consequently compound the problems of installation and wear.

I have found that I can obviate the problems enumerated in the above by providing a single piece full hoop fluid damper and spring combination that is considerably simpler than heretofore designs.

DISCLOSURE OF INVENTION

An object of this invention is to provide an improved fluid damper and mechanical spring for aircraft gas turbine engines.

A feature of this invention is to incorporate both the spring and fluid damper into a one-piece ring that surrounds the bearing which is characterized as being less complicated to manufacture and assemble at a reduced axial envelope.

The foregoing and other features and advantages of the present invention will become more apparent from the following description and accompanying drawings.

BRIEF DESCRIPTION OF THE DRAWINGS

FIG. 1 is a partial view in section and schematic illustrating the invention.

FIG. 2 is a partial view in section taken along line 2—2 of FIG. 1 illustrating the details of the invention; and FIG. 3 is a partial projected view illustrating one of the fluid damper cavities.

BEST MODE FOR CARRYING OUT THE INVENTION

While in its preferred embodiment the invention has utility in gas turbine engines, as will be appreciated by those skilled in this art, the fluid damper described hereinbelow has utility in any high speed rotor application where dynamic unbalance may be a problem. This invention is particularly efficacious where the axial envelope dimensions are limited and simplicity of design and assembly are considerations.

As shown in FIGS. 1, 2 and 3, the fluid damper generally indicated by reference numeral 10 serves to dampen the unbalance occasioned by the rotor rotatably supported to shaft 12. As noted in FIG. 1, the shaft 12 is supported by the radial bearing generally indicated by reference numeral 14 comprising the plurality of circumferentially spaced rollers 16 sandwiched between the inner race 18, rotatably supported to shaft 12, and outer race 20 supported to the relatively fixed ring-like support member 22 secured into position by the nut 24 threadily secured thereto. The relatively fixed ring-like support member 22, hereinafter referred to as the inner housing as will be described hereinbelow serves both as the fluid damper and mechanical spring. The inner housing is supported to the outer housing 28 typically referred to as the bearing compartment housing since it houses and supports radial bearing 14. The orbital movement that is induced by the rotation of shaft 12, inner race 18 and the roller bearings is transmitted through outer race 20 through the inner housing, its fluid damper and spring and reacted by the outer housing which is typically grounded to the engine's case (not shown).

According to this invention and referring to FIG. 2, the inner housing 22 is dimensioned to include a plurality of arcuate slots 30 circumferentially spaced through the radial depth of the inner housing. Adjacent slots 30 are separated by the entire radial depth of the inner housing 22 which defines ties 31. Radial slots 32 located midway between ties 31 define a beam-like element 33 which behaves as a cantilever spring formed on each side of tie 31. The arcuate outer surface 34 of inner housing 22 spanning between adjacent radial slots 32 hereinafter referred to as spring beam 35 serve to carry each of the fluid dampers which likewise are circumferentially spaced. Since each of the fluid dampers are identical, only one will be described for the sake of simplicity and convenience.

As noted in FIG. 3, the damper consists of an oval or other appropriate shaped recess or cavity 37 formed on the outer surface 34 of each of the spring beams 35 of the inner housing 22. Each recess is bounded by groove 36 that serves to retain a "O" ring seal.

Fluid is admitted into the recess or cavity 37 which is fed thereto through the supply orifice 39 that communicates with manifold 38 that is continuously fed pressurized fluid. Each of the cavities includes a discharge orifice or vent 40 that drains to sump or bearing compartment pressure. The inlet supply orifice is larger than the vent orifice to assure that sufficient pressure remains in the fluid cavity so as to develop sufficient hydrodynamic forces to dampen the normal amplitudes of the vibratory motion transmitted through shaft 12.

To assure proper damping in the event of a severe unbalance due to a loss blade on the rotor and the like, this design provides the mechanical spring defined by the spring beams 35. Under normal operation, damping is provided when the outer race 20 is radially loaded which in turn, is transmitted through ties 31 to the fluid damper. Whenever the hydrodynamic forces are overcome, the damper bottoms out against the inner surface of housing 28 and the mechanical spring beams 35 attenuate the higher amplitudes.

Although this invention has been shown and described with respect to detailed embodiments thereof, it will be understood by those skilled in the art that various changes in form and detail thereof may be made without departing from the spirit and scope of the claimed invention.

I claim:

1. A fluid damper and mechanical spring combination for a radial bearing supporting a shaft of a gas turbine engine, said radial bearing including an inner race, an outer race, a plurality of rollers circumferentially disposed between said inner race and said outer race, an outer housing supporting said radial bearing having a circular surface surrounding said outer race, a full ring-like support member having a complementary surface to and facing said circular surface of outer housing, said single piece full ring-like support member having a plurality of circumferentially spaced cavities formed in said complementary surface, and a plurality of arcuate slots circumferentially spaced in said full ring-like member overlying said cavities and means for supplying fluid to said cavities whereby said full ring-like support member provides the damping and mechanical spring for said radial bearing.

2. A fluid damping and mechanical spring combination as claimed in claim 1 wherein tie portions in said full ring-like support member separate adjacent cavities and define means for transmitting radial loads from said shaft to said fluid damper.

3. A fluid damper and mechanical spring combination as claimed in claim 2 including seal means bounding the periphery of said cavities.

4. A fluid damper and mechanical spring combination as claimed in claim 3 wherein said cavities are dimensioned in oval shapes taken along the planar surface and "O" ring are supported in grooves formed in said complementary surface of said full ring-like support member.

* * * * *